United States Patent [19]

Lobley

[11] Patent Number: 4,486,399
[45] Date of Patent: Dec. 4, 1984

[54] METHOD TO REDUCE THE POTENTIAL SALT CAKE CONTENT OF CHLORINE DIOXIDE GENERATOR SPENT ACIDS

[75] Inventor: Derek G. Lobley, Surrey, Canada

[73] Assignee: Multifibre Process Limited, New Westminster, Canada

[21] Appl. No.: 510,459

[22] Filed: Jul. 1, 1983

[51] Int. Cl.³ .............................................. C01B 11/06
[52] U.S. Cl. .................................. 423/478; 423/479; 423/480
[58] Field of Search ............... 423/477, 478, 479, 480, 423/551, 531

[56] References Cited

U.S. PATENT DOCUMENTS

| | | | |
|---|---|---|---|
| 3,322,497 | 5/1967 | Martin | 423/479 |
| 3,864,457 | 2/1975 | Hoekje et al. | 423/478 |
| 4,081,520 | 3/1978 | Swindells et al. | 423/478 |
| 4,104,365 | 8/1978 | Howard et al. | 423/478 X |
| 4,325,934 | 4/1982 | Swindells et al. | 423/478 |

FOREIGN PATENT DOCUMENTS 543591  7/1957  Canada .............................. 423/480

Primary Examiner—John Doll
Assistant Examiner—Steven Capella
Attorney, Agent, or Firm—Townsend and Townsend

[57] ABSTRACT

A method of generating chlorine dioxide that comprises forming chloric acid by the action of sulphuric acid on a chlorate in a generator in the liquid phase. The chloric acid is reduced to produce chlorine dioxide. The chlorate is fed to the generator as a solid.

13 Claims, 4 Drawing Figures

METHOD TO REDUCE THE POTENTIAL SALT CAKE CONTENT OF CHLORINE DIOXIDE GENERATOR SPENT ACIDS

FIELD OF THE INVENTION

This invention relates to a process for the generation of chlorine dioxide gas.

DESCRIPTION OF THE PRIOR ART

Chlorine dioxide is used in pulp and paper mills for the production of bleaching solution. The waste acid from the generating process is generally directed to the recovery process to provide sulphur and sodium makeup within the pulp cooking circuit.

Chlorine dioxide is produced by four principle processes; the Mathieson, Solvay, R-2 and R-3 processes.

All these processes reduce a chlorate, usually sodium chlorate, in a strong sulphuric acid medium. Generally speaking, the processes differ in the reducing agent used. In the Mathieson process the reducing agent is sulphur dioxide, in the Solvay process the reducing agent is methanol and in the R-2 and R-3 processes, the reducing agent is sodium chloride.

An essential part of all these processes is the reaction to produce chloric acid, which is directly reduced by the reducing agents to produce chlorine dioxide gas. The chlorine dioxide gas is removed from the reaction solution as a 10–15% gaseous mixture in air.

The four processes mentioned may be described by the following simplified equations:

All Processes

$$H_2SO_4 + 2NaClO_3 \longrightarrow 2HClO_3 + Na_2SO_4 \quad (1)$$

Mathieson Process

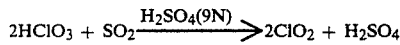

$$2HClO_3 + SO_2 \xrightarrow{H_2SO_4(9N)} 2ClO_2 + H_2SO_4 \quad (2)$$

Solvay Process

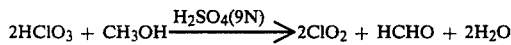

$$2HClO_3 + CH_3OH \xrightarrow{H_2SO_4(9N)} 2ClO_2 + HCHO + 2H_2O \quad (3)$$

R-2 Process

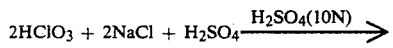

$$2HClO_3 + 2NaCl + H_2SO_4 \xrightarrow{H_2SO_4(10N)} \quad (4)$$

$$2ClO_2 + Cl_2 + Na_2SO_4 + 2H_2O$$

R-3 Process

As R-2 but with reactor acidity at 4N. (5)

All the above processes require a continuous supply of sulphuric acid to maintain the requisite level of acidity for efficient chlorine dioxide production. Equation 2 shows that the Mathieson process does not consume any acid, since sulphuric acid sufficient to combine with sodium added as chlorate is generated from the sulphur dioxide used as the reducing agent. Thus, the Mathieson process offers an excellent possibility of generating chlorine dioxide without the consumption of fresh acid. In the Solvay process, acid is consumed in the initial generation of chloric acid, and additional acid is consumed for the generation of hydrochloric acid, as in the case with the R-2 and R-3 processes.

The desirability of not using sulphuric acid in the generation system, is two-fold. First there is the economic advantage of dispensing with an expensive compound. Secondly it avoids the need to reduce sulphur as sulphate in the recovery cycle. The current practice necessitates the incineration of spent acids from Mathieson, Solvay and R-2 processes which creates the problem of sulphidity control in the digester cooking liquor. It was from this that the R-3 system, which is described and claimed in U.S. Pat. No. 3,446,584, was invented. In the R-3 system a chlorine dioxide generator could operate at low normalities in order to separate the neutral salts in sulphuric acid. However the process requires the complete scrapping of existing generation equipment.

Effluents from chlorine dioxide generators have weight compositions in the range 20–30% sodium sulphate; 25–35% sulphuric acid; balance water and dissolved chlorine dioxide, chlorine, $SO_2$, ferric, calcium, chloride and chlorate ions. For example, a typical effluent from a Mathieson or Solvay process would have the following composition:

| | |
|---|---|
| Sodium Sulfate ($Na_2SO_4$) | 24.5% W/W |
| Sulphuric Acid ($H_2SO_4$) | 28.2% W/W |
| Water | 46.3% W/W |
| Sodium Chlorate ($NaClO_3$) | 0.6% W/W |
| Sodium Chloride ($NaCl$) | 0.1% W/W |
| Gases, Etc. | 0.1% W/W |

A typical effluent from the R-2 process has the following approximate composition:

| | |
|---|---|
| Sodium Sulfate ($Na_2SO_4$) | 22.3% W/W |
| Sulphuric Acid ($H_2SO_4$) | 33.6% W/W |
| Water | 44.0% W/W |
| Sodium Chlorate ($NaClO_3$) | 0.33% W/W |
| Sodium Chloride ($NaCl$) | 0.20% W/W |
| Gases, Etc. | 0.10% W/W |

In the case of the R-3 process where neutral sodium sulfate is formed in the generator, the waste product would have the approximate following composition:

| | |
|---|---|
| Sodium Sulfate ($Na_2SO_4$) | 90% W/W |
| Sulphuric Acid ($H_2SO_4$) | Trace |
| Sodium Chlorate ($NaClO_3$) | " |
| Sodium Chloride ($NaCl$) | " |
| Water | 10% W/W |

The analysis of salt cake emanating from the filter in the R-3 process is variable and dependent on the amount of wash water supplied on the filter cake. If one examines a phase diagram of the system $Na_2SO_4$—$H_2O$—$H_2SO_4$, it becomes clear that it is difficult to isolate sodium sulfate from the mixture. It will of course be realized that reference to the phase diagram is an over simplification, as the effluent from the chlorine dioxide generator also contains chlorate, chloride, traces of chlorine dioxide, chlorine and various other chemicals. However, generally the effluents all lie in that area of the phase diagram where trisodium hydrogen disulphate $Na_3H(SO_4)_2$ or sesqui salt crystallize if the effluent is cooled.

The acid recovery process (ARP), is described in U.S. Pat. No. 4,104,365. In the process sulphuric acid is separated from neutral sodium sulphate in spent chlorine dioxide generator liquor with an 85% precipitation efficiency under normal conditions with total recycle of the sulphuric acid after concentration from the distilled product. There are therefore two available systems for recovery of sodium salts from the generator waste acid; ARP and the R-3 ClO$_2$ process.

The recovery of sodium salts from the ARP system relies upon the polarization of water within the waste acid, thus moving the chemical equilibrium over to the neutral salt zone. The R-3 process relies upon the salting out of salt cake in the generator by the continuous addition and recycle of sodium chlorate solutions to provide a common ion effect, thus precipitating the neutral salt. The acid recovery process which comprises an added chemical plant to the existing chlorine dioxide plant, represents the only true method known wherein all the sulphuric acid is recovered in the Mathieson process for eventual recycle back into the primary generator. However, the extra equipment and space requirement is somewhat expensive. Moreover, the distillation and recovery of methanol, and reconcentration of sulphuric acid, can be onerous and energy consuming. It should be noted that all chlorine dioxide processes use sulphuric acid to convert NaClO$_3$ to HClO$_3$. Furthermore, sulphuric acid is required to maintain a 9N acidity in the ClO$_2$ generator, since NaClO$_3$ is fed in aqueous solution at 40-50% concentration by weight. These conditions are well recognized in the industry and are adequately shown in equations (1)-(4).

SUMMARY OF THE INVENTION

The present invention seeks to provide a process that, except for startup, does not use sulphuric acid within the generator. In instances where chlorine dioxide is being generated using salt or methanol as the reducing agent, the amount of sulphuric acid entering the generator will be significantly reduced.

Accordingly the present invention is in a method of generating chlorine dioxide that comprises forming chloric acid by the action of sulphuric acid on a chlorate in a generator in the liquid phase, and reducing the chloric acid to produce chlorine dioxide and is the improvement that comprises feeding the chlorate to the generator as a solid.

In accordance with the usual practice the chlorate will usually be sodium chlorate. In a preferred aspect the reducing agent will be sulphur dioxide. The feeding of dry crystalline NaClO$_3$ into the ClO$_2$ reactor offers a unique opportunity to reduce, and in the case of the Mathieson process to eliminate completely, the use of H$_2$SO$_4$ as a continuous feed stock to the generator. The H$_2$SO$_4$ consumed in equation (1) above is returned in equation (2) above, and since chemical reactions are far from perfect, more 'by product' acid will be returned as a result of ClO$_2$ generation inefficiency.

In the case where SO$_2$ reacts with produced ClO$_2$, then even more H$_2$SO$_4$ is produced as follows:

$$6H_2O + 5SO_2 + 2ClO_2 \rightarrow 5H_2SO_4 + 2HCl \qquad (6)$$

A further side reaction within the Mathieson process will also produce extra H$_2$SO$_4$ as follows:

$$HClO_3 + 3SO_2 + 3H_2O \rightarrow 3H_2SO_4 + HCl \qquad (7)$$

In practical terms, a Mathieson type ClO$_2$ generator using 46% W/W NaClO$_3$ as feed stock will demand and produce the following amounts of H$_2$SO$_4$/ton ClO$_2$,

| Gen. Eff. % | NaClO$_3$ In | H$_2$SO$_4$ In | SO$_2$ In | Na$_2$SO$_4$ Out | H$_2$SO$_4$ Out |
|---|---|---|---|---|---|
| 100 | 1.58 | 1.32 | 0.48 | 1.05 | 1.32 |
| 96 | 1.65 | 1.26 | 0.6 | 1.1 | 1.38 |
| 94 | 1.68 | 1.22 | 0.66 | 1.12 | 1.40 |
| 92 | 1.72 | 1.17 | 0.73 | 1.14 | 1.43 |
| 90 | 1.76 | 1.14 | 0.80 | 1.17 | 1.47 |

There is more H$_2$SO$_4$ in the generator waste acid than in the feed, at the lower efficiencies. This acid is produced through either equation (6) or (7) as a result of system inefficiency. It therefore follows, that once a Mathieson process generator has been primed with acid, the reaction inefficiencies will sustain the required acidity at between 7N and 12N providing dilution water is added to control the rise in acidity.

With a dry NaClO$_3$ crystal feed an acid salt will be produced as a precipitate in the generator after cooling in an external vessel. This acid salt is a form that lies in the Na$_3$H(SO$_4$)$_2$ phase of the equilibrium diagram. It is also known from the work of Pascal and Ero in Bulletin de la Societe Chimique (4) 25, 1919—page 44, that sulphuric acid of 30% by weight in a saturated solution of sodium sulphate up to 90° C. will produce a precipitate of sesqui salt. This point is demonstrated in FIG. 3 which plots the temperatures between 15° C. and 97° C. and shows only 1 anomaly at about 25° C.

BRIEF DESCRIPTION OF THE DRAWINGS

Aspects of the invention are illustrated, by way of example, in the accompanying drawings in which:

FIG. 1 illustrates an apparatus able to carry out the present process. The apparatus comprises a primary chlorine dioxide generator 2, a secondary chlorine dioxide generator 4 and an absorption column 6. Solid chlorate is fed from a hopper 8 into the primary generator 2 through a volumetric feeder 10. An air bleed through a line 12 allows a free flow of chlorate, that is it prevents crystal sticking or hanging up. Sulphuric acid at 93-96% concentration is fed through line 14 and is used solely for startup in a Mathieson process generator 2 and at much reduced levels of concentration in Solvay and chloride reduction processes. The produced chlorine dioxide gas leaves the primary and secondary generators through line 16 to pass to the absorption column 6. Foam or liquid from generator 2 passes along line 18 to the secondary chlorine dioxide generator 4 and liquid overflow from the secondary generator 4 passes through line 20 to discharge line 24 of a salt cake filter 26 and then into a standard recovery cycle. Vacuum for the salt cake filter 26 is provided by a steam eductor 28 through which steam passes to reduce pressure in a salt cake receiver 30 that communicates with filter 26 through a line 32. In the case of the Mathieson process dilution water is fed through line 34 to control acid normality. Filtrate from the filter 26 passes to the primary generator 2 through lines 36 and 38 by the action of pump 40.

Figure 1:
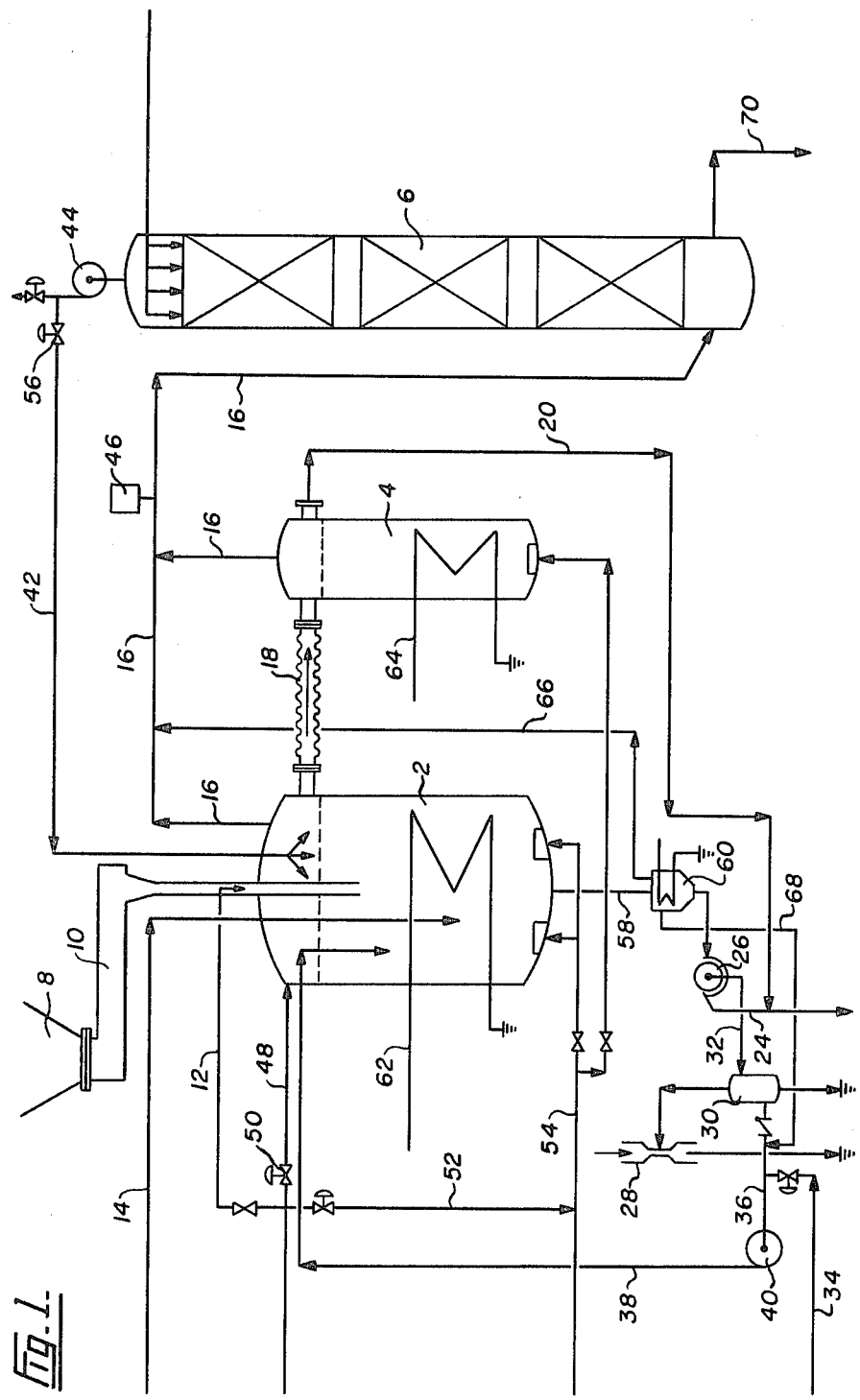
FIG. 1 is a flow diagram of a chlorine dioxide generation process according to the present invention.

Dilution air is cycled from the absorption tower 6 exhaust gas through line 42 under the influence of an exhaust fan 44. The amount of air is controlled by a chlorine dioxide gas analyzer 46 to ensure a chlorine dioxide partial pressure in the absorption column 6 between 0.05 and 0.2 atmospheres. Dilution air is also fed through line 48 in generator 2 and the feed of this air is controlled by a valve 50. There is a take-off pipe 52 so that dilution air may be mixed with sulphur dioxide gas passing along line 54. A mixture of sulphur dioxide and dilution air is fed to the primary and secondary chlorine dioxide generators at their bases through line 54. The quantity of dilution air is proportional to the reducing agent added, sulphur dioxide, sodium chloride or methanol and compliments recycled gas fed into the primary generator 2 through line 42 from absorption column 6. Control of the recycled gas in line 42 is controlled by a valve 56. Primary generator solution at approximately 70° C. leaves the generator 2 through line 58. Generally the temperature will be in the range of 45°–90° C. and the generator solution is saturated with sulphate ion at between 7N and 12N sulphuric acid and contains dissolved chlorine dioxide and chlorine gases. The solution enters cooling vessel 60 and is chilled to approximetaly 40° C. generally in the range 20°–60° C., dependent upon the primary generator liquid phase temperature. It should be noted that both the primary and the secondary chlorine dioxide generators are provided with temperature control coils 62 and 64.

Cooling vessel 60 comprises a jacketted titanium tank with a conical bottom and a vented top to permit exhaust of chlorine dioxide and chlorine gases through line 66 into the main gas line 16. A paddle type agitator is mounted in cooling vessel 60 and has PTFE scrapers to prevent buildup of sulphate crystal on the interior walls of the vessel. Supernatant liquor from the cooling tank 60 flows through line 68 to the suction side of the filtrate recycle pump 40.

The flow from the cooling tank 60 passes to salt cake filter 26 and the solids are discharged to the recovery section of the mill. The filtrate is recycled back to the chlorine dioxide generator through lines 32, 36 and 38.

The desired product is fed from the absorption column through line 70.

Figure 2:
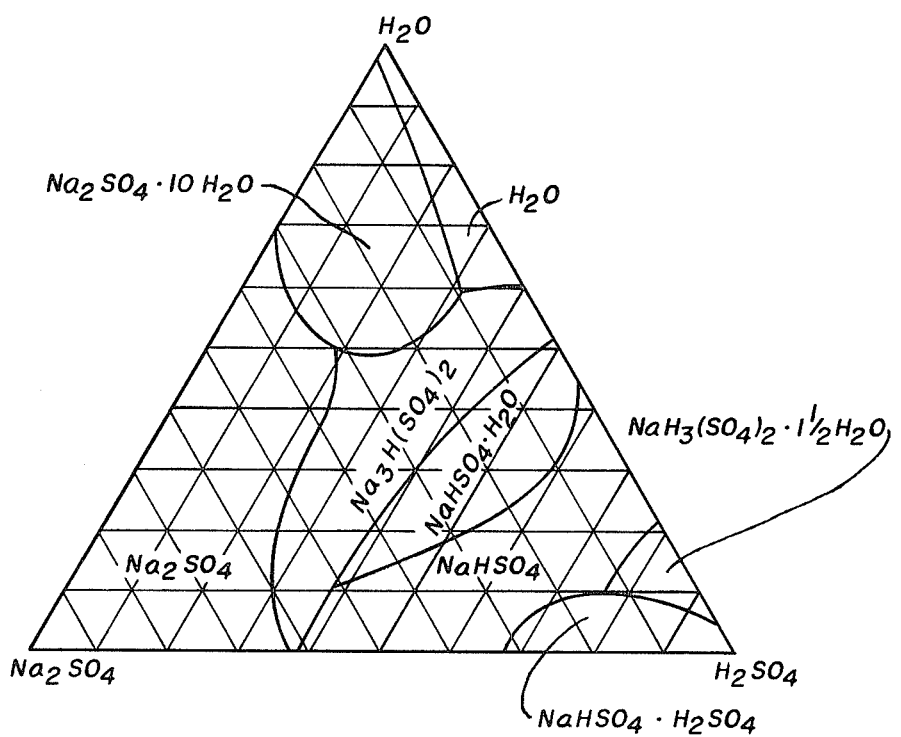
FIG. 2 is a phase diagram of the system sodium sulphate-water-sulphuric acid.
Figure 3:
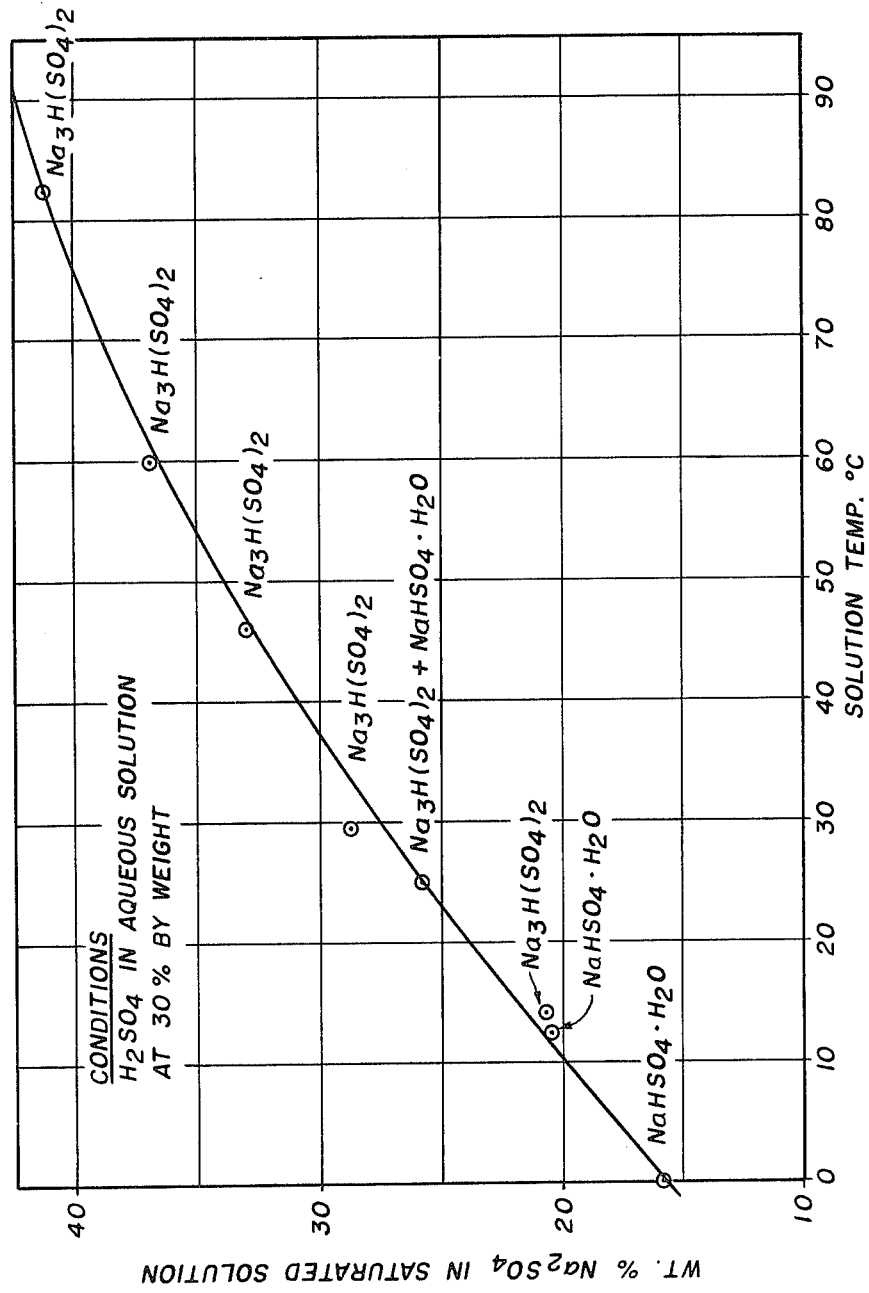
FIG. 3 is a graph relating temperature to the production of sesquisulphate.

FIG. 2 is a phase diagram indicating the above statement that it is difficult to isolate sodium sulphate from a mixture of sodium sulphate, water and sulphuric acid. As indicated generally the effluents all lie in that area of the phase diagram where trisodium hydrogen disulphate or the sesqui salt crystallize if the effluent is cooled.

The following examples illustrate the invention. Experiments were conducted to check equilibrium diagram data as published by Seidell, "Solubilities of Inorganic and Metal Organic Compounds".

EXAMPLE 1

A batch of 9N $H_2SO_4$ solution was prepared then saturated with $Na_2SO_4$ at 70° C. Sample 1A consisted of 100 mls of the above solution with 4 grams of $NaClO_3$ added. The chlorate was stirred in and dissolved. The mass was cooled to 40° C. and the sulphate salts filtered off and vacuum dried at 50° C.

The dried salt was then titrated for acidity, and found to contain 24.1% $H_2SO_4$.

Sample 1B—procedure as above, but with 6 gms $NaClO_3$ in 100 mls of solution. Result 25.1% acid in salt.

Sample 1C—as above, but with 8 gms of $NaClO_3$ in 100 mls of solution. Result 24.6% acid in salt.

Sample 1D—as above, but with 10 gms of $NaClO_3$ in 100 mls of solution. Result 23.6% acid in salt.

EXAMPLE 2

Example 1 was repeated, utilizing a 70° C. saturated salt cake solution in a 9N $H_2SO_4$ medium.

Sample 2A—was identical to Sample 1A in Example 1, except 1 ml. of $CH_3OH$ was added at 70° C. and $ClO_2$ gas was evolved after consumption of the $NaClO_3$ by the methanol. The sample was cooled to 40° C. and the sulphate salts filtered off and vacuum dried at 50° C. The dried salt was then titrated for acidity, and found to contain 21.3% $H_2SO_4$.

Sample 2B—procedure as above but with 6 gms $NaClO_3$ and 1.5 mls $CH_3OH$. Result 21.3% acid in salt.

Sample 2C—as above but with 8 gms $NaClO_3$ and 2 mls $CH_3OH$ Result 22.0% $H_2SO_4$ Sample 2D—as above but with 10 gms $NaClO_3$ and 2.5 mls $CH_3OH$. Result 22.4% $H_2SO_4$ The above experiments show beyond doubt that cooling of saturated sulphate solutions in 9N sulphuric acid down to 40° C. produces an acid salt $Na_3H(SO_4)_2$ containing 18.7% $H_2SO_4$ with trace bisulphate ($NaHSO_4$) impurities.

Since this new process deals with evolution of chlorine dioxide at an 8–11 acid normality and saturated sulphate conditions at 40° C., a series of experiments was conducted to determine differences of $ClO_2$ evolution between existing processes with the same acid normalities.

EXAMPLE 3

Samples were prepared using a standard Mathieson $ClO_2$ generator solution which is 24% W/W $Na_2SO_4$ in a 9N $H_2SO_4$ solution.

Four 100 ml. samples were measured out as follows:

|  | $NaClO_3$ | $CH_3OH$ | Exotherm °C. |
| --- | --- | --- | --- |
| Sample 3A | 2 g. | 0.5 mls | −0.5 |
| Sample 3B | 4 g. | 1.0 mls | +5.5 |
| Sample 3C | 6 g. | 1.5 mls | +13.5 |
| Sample 3D | 8 g. | 2.0 mls | +20.0 |

The starting temperature for each sample was 70° C. and the exotherm represents the maximum temperature rise (or drop) when methanol was added to the sample after sodium chlorate was dissolved.

Figure 4:
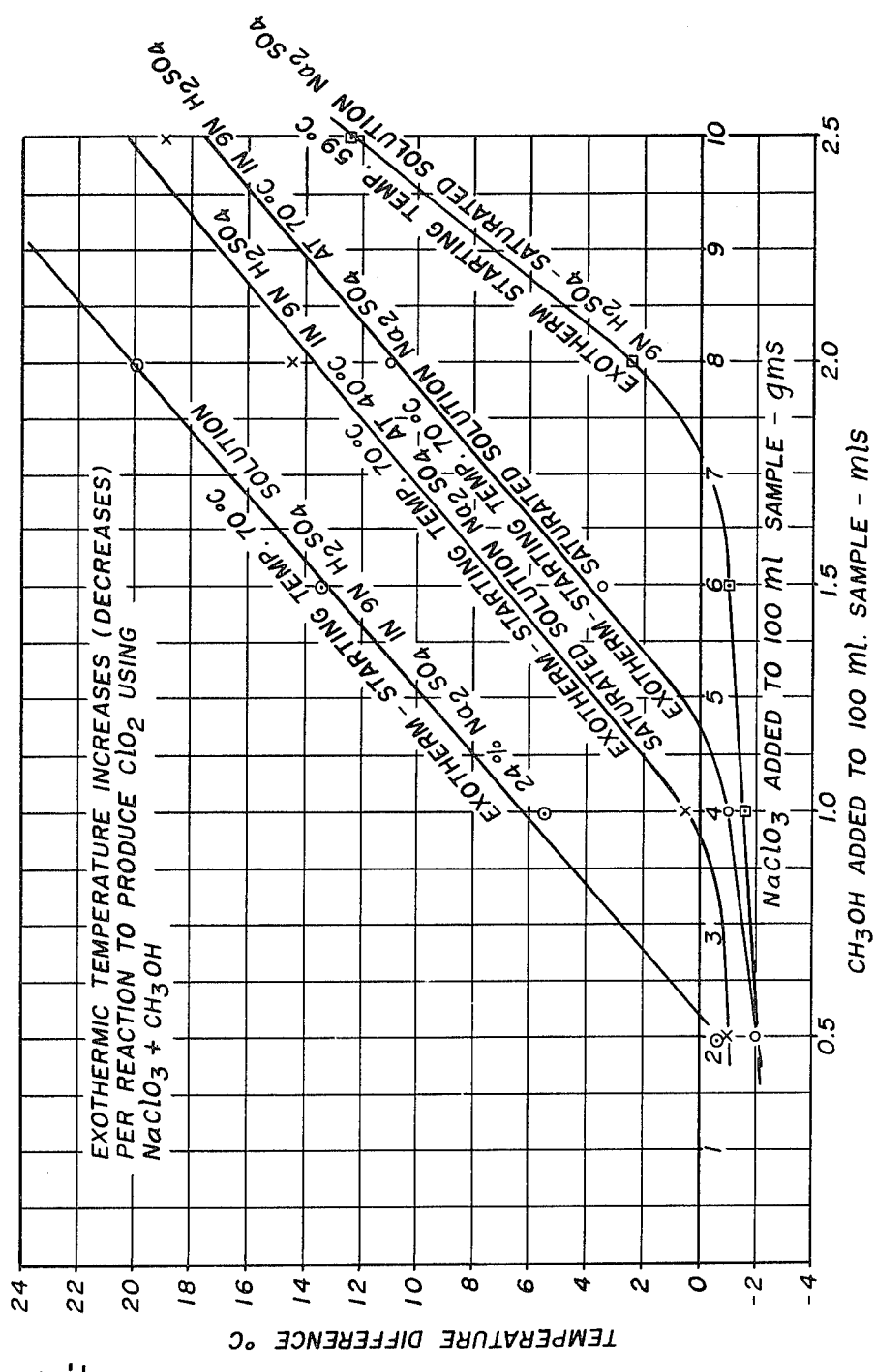
FIG. 4 relates temperature change with the additional of methanol, referred to in Example 3.

The results obtained are plotted in FIG. 4, together with the results from the following Examples.

EXAMPLE 4

A half liter batch of 9N $H_2SO_4$ solution was prepared, with $Na_2SO_4$ saturated at 70° C.

Four 100 mil samples were measured out as follows:

|  | $NaClO_3$ | $CH_3OH$ | Exotherm °C. |
| --- | --- | --- | --- |
| Sample 4A | 2 g. | 0.5 mls | −2 |
| Sample 4B | 4 g. | 1.0 mls | −1 |
| Sample 4C | 6 gt | 1.5 mls | +3.5 |
| Sample 4D | 8 g. | 2.0 mls | +11.0 |

The starting temperature and conditions were the same as Example 3.

EXAMPLE 5

A sample was prepared exactly as Example 4 except for the following:

The solution was cooled to 40° C. and the salt filtered off.

Five 100 mil samples were measured out as follows:

|  | NaClO$_3$ | Ch$_3$OH | Exotherm °C. |
|---|---|---|---|
| Sample 5A | 2 g. | 0.5 mls | −1 |
| Sample 5B | 4 g. | 1.0 mls | +0.5 |
| Sample 5C | 6 g. | 1.5 mls | +7.5 |
| Sample 5D | 8 g. | 2.0 mls | +14.5 |
| Sample 5E | 10 g. | 2.5 mls | +19.0 |

The starting temperature for each sample was 70° C., the same as Example 4.

EXAMPLE 6

A sample was prepared exactly as Example 4 with a saturated sulphate solution in 9N sulphuric acid.

|  | NaClO$_3$ | CH$_3$OH | Exotherm °C. |
|---|---|---|---|
| Sample 6A | 2 | 0.5 mls | −2 |
| Sample 6B | 4 | 1.0 mls | −1.5 |
| Sample 6C | 6 | 1.5 mls | −1.0 |
| Sample 6D | 8 | 2.0 mls | +2.5 |
| Sample 6E | 10 | 2.5 mls | +12.5 |

The starting temperature for each sample was 59° C.

SUMMARY

Conclusion from Test Work

Graphical results are tabulated in FIG. 4. It is apparent that higher sulphate concentrations in the generator acid inhibit the evolution of chlorine dioxide gas. To achieve comparable or improved reaction rates, the ClO$_2$ generator temperature must be increased over the norm; the norm being typically 45° C. for Mathieson, 60° C. for Solvay, and 50° C. for the chloride reduction process.

Furthermore, sodium chlorate residuals must be increased to create a greater driving force with the appropriate reducing agent. From the graph it can be determined that an approximate increase of 20 gpl as NaClO$_3$ is necessary in the generator liquor to achieve the same exothermic temperature when considering Examples 1 and 5.

Sodium Chlorate Losses in Salt Cake

Since a greater driving force is required in the generator (when the salt content is increased) between the oxidizing and reducing agent, it might be considered important for the sesqui-salt cake to be as dry as possible in order to reduce entrained sodium chlorate losses.

Experiments showed that sesqui-salt may be filtered readily to 75% W/W solids.

With a sodium chlorate residual of 60 gpl in the generator, the losses would amount to 22 lbs. of NaClO$_3$ per ton of ClO$_2$. This equates to only a 0.6% overall loss of sodium chlorate.

Absorption Tower Gas Recycle

It was shown that the reaction rate to produce ClO$_2$ is depressed as the temperature is lowered. To produce a comparable or increased production of ClO$_2$, the driving force and reaction temperature must be increased.

To overcome the potential problem of an increased ClO$_2$ gas temperature and therefore an increased energy release whenever the gas decomposes or 'puffs', it is desirable to recycle the cold absorption tower off-gases back to the vapour phase of the generator.

There is a four-fold advantage in adopting this technique, which takes advantage of the chilled water already entering the absorption system.

1. The trace amounts of chlorine and chlorine dioxide gas emanating from the absorption column, have a further chance to be absorbed by recycling.
2. By eliminating at least 50% of diluent air through the liquid mass of the ClO$_2$ generator, a greater volume of reaction liquor is available for use; and in the case of the SO$_2$ reduction process (Mathieson), a greater driving force is created between the SO$_2$ gas and chloric acid in solution.
3. Where side or secondary reactions occur to produce entrained acids in the gaseous phase, such as is the case in equations (6) and (7), these acids will be condensed by introducing cold recycled gas from the absorption column.
4. Less energy will be used in compressing decreased diluent air through the generator sparger plates and liquid mass.

Solid Sodium Chlorate Unloading and ClO$_2$ Generator Feed

The present practice of unloading crystal sodium chlorate from a tank car by using an equal weight of hot water at approximately 70° C. will be eliminated. Furthermore, storage of the solution in holding tanks equipped with steam coils will not be necessary.

The process of the invention calls for the unloading of sodium chlorate and/or chloride crystal from a tank car or truck using an air compressor, gas separation cyclone and storage bin.

Feed to the ClO$_2$ generator will be from the chlorate storage bin or hopper, into a volumetric feeder with accurate volume control, then into the ClO$_2$ generator, as shown in FIG. 1.

I claim:

1. In a method of generating chlorine dioxide that comprises forming chloric acid by the action of sulphuric acid on a chlorate in a generator in the liquid phase and reducing the chloric acid to produce chlorine dioxide the improvement that comprises feeding the chlorate to the generator as a solid.

2. A method as claimed in claim 1 in which the chlorate is sodium chlorate.

3. A method as claimed in claim 1 in which the liquid phase in the generator is maintained at a temperature in the range 40° to 100° C. and below atmospheric pressure.

4. A method as claimed in claim 2 in which the sodium chlorate concentration in the generator is maintained between 30 and 150 grams per liter in a sulphuric acid solution having a normality of between 7N and 12N.

5. A method as claimed in claim 1 in which the generator liquid is cooled to a temperature between 20° and 60° C. in a cooling vessel having an agitator to precipitate sulphate salt, the salt being filtered and sent to a recovery system and supernatant liquor from the cooler being recycled to the generator.

6. A method as claimed in claim 5 in which the filtrate from the sulphate salt filter is recycled back to the chlorine dioxide generator.

7. A method as claimed in claim 1 in which the chloric acid is reduced by sulphur dioxide.

8. A method as claimed in claim 1 in which the reducing agent is selected from methanol hydrochloric acid and sodium chloride.

9. A method as claimed in claim 7 in which water is added to the generator to maintain its acid normality.

10. A method as claimed in claim 1 including the step of absorbing the chlorine dioxide in water in an absorption column and exhausting unabsorbed chlorine dioxide.

11. A method as claimed in claim 10 in which the exhausted chlorine dioxide and air is recycled into the chlorine dioxide generator to reduce chlorine dioxide decomposition energy and condense acid gases for further reuse in the generator.

12. A method as claimed in claim 11 including feeding air into the chlorine dioxide generator through spargers and into the liquid phase of the generator.

13. A method as claimed in claim 10 in which absorption tower gas is recycled and used to maintain a chlorine dioxide partial pressure in the absorption column of between 0.05 and 0.2 atmosphere.

* * * * *